Dec. 8, 1959  D. L. CRONIN  2,916,687
ELECTRONIC THREE-PHASE WAVE GENERATOR
Filed March 28, 1958  2 Sheets-Sheet 1

INVENTOR.
DONALD L. CRONIN.
BY
Christie, Parker & Hale
ATTORNEYS

Dec. 8, 1959    D. L. CRONIN    2,916,687
ELECTRONIC THREE-PHASE WAVE GENERATOR
Filed March 28, 1958    2 Sheets-Sheet 2

INVENTOR.
DONALD L. CRONIN
BY Christie, Parker & Hale
ATTORNEYS

United States Patent Office

2,916,687
Patented Dec. 8, 1959

2,916,687

ELECTRONIC THREE-PHASE WAVE GENERATOR

Donald L. Cronin, Anaheim, Calif., assignor to Siegler Corporation, Anaheim, Calif., a corporation of Delaware Application March 28, 1958, Serial No. 724,692

14 Claims. (Cl. 321—5)

The present invention relates to electric signal generators, and more particularly to an electronic three-phase wave generator.

Such wave generators find wide application in electronic inverters for converting a direct current energizing potential to a three-phase supply voltage for operating the electrical equipment incorporated in missiles and the like. Various types of three-phase wave generators have heretofore been proposed for obtaining the three-phase alternating current voltage that may be used as a source of power or used to drive suitable amplifiers, which in turn supply the necessary three-phase power to a load. These prior art three-phase wave generators are expensive, inefficient, and employ complex circuitry. Furthermore, many of the prior art generators are difficult to control so that the phase relationship of the three-phase output signal is always balanced. One type of prior art wave generator that has been used in the past is similar to a memory storage type ring oscillator in that a plurality of signal amplifying devices are connected in a ring configuration so that each device controls the operation of the succeeding device. The output signal from such a generator is usually in the form of three square wave signals shifted in phase 120° from each other. While these ring oscillator type wave generators are fairly small and efficient, it is difficult to adjust the frequency of the generators due to the fact that an adjustment of the circuitry of one phase is reflected into the circuits of the other two phases. It is also difficult to obtain the proper phase balancing between the three-phase output signal of such generators. Furthermore, the time durations of the positive and negative portions of the output signal developed in any one of the three phases are difficult to balance in the memory storage ring type generators.

The present invention provides a three-phase wave generator that is relatively simple, inexpensive to manufacture, efficient, easy to adjust for different operating frequencies and inherently phase-balanced. The wave generator of the present invention includes a source of periodically varying control signals and first, second and third multistable devices functioning as wave generating elements switchable between two conductive conditions. Each of the multistable devices is arranged to have two discrete states of operation and is adapted to change its state of operation in response to the application of predetermined gating signals thereto. The multistable devices are connected in a closed or ring circuit configuration. The wave generator further includes circuit means responsive to the control signal and to the state of each of the multistable devices for applying the predetermined gating signals to each of the devices in a preselected sequence to establish a three-phase output signal from the three multistable devices. Means are coupled to each of the devices for deriving the respective phases of the three-phase output signal.

The invention is more fully described with reference to the accompanying drawings, in which:

Fig. 3 is a schematic circuit diagram showing the details of one way to carry out the invention shown in Fig. 1.

Figure 1:
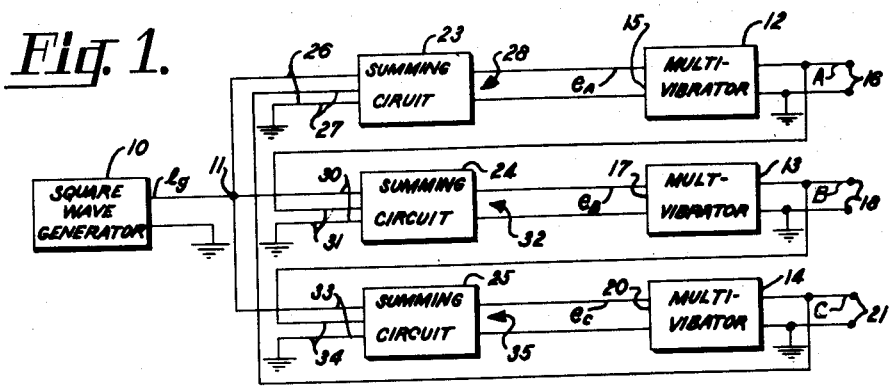
Fig. 1 is a block diagram of a three-phase wave generator employing the principles of the present invention.

Referring now to the drawings, and more particularly to Fig. 1 thereof, the wave generator embodying the principles of the present invention includes a source of control signals such as a square wave generator 10 having a pair of output terminals 11 across which a substantially square wave of a predetermined frequency is established. Three multistable devices such as multivibrators 12, 13 and 14 are sequentially controlled by the square wave generator 10, as will be more fully described hereinafter. The multivibrator 12 includes an input circuit 15 and a pair of output terminals 16; the multivibrator 13 includes an input circuit 17 and a pair of output terminals 18, and the multivibrator 14 includes an input circuit 20 and a pair of output terminals 21. One terminal of the output terminals of the square wave generator 10 and the multivibrators 12, 13 and 14 is connected to ground, as is shown. The multivibrators may be bistable, monostable or astable. It is only necessary that each of the multivibrators has a first and second state of operation of at least temporary stability for the time interval of one and one-half cycles of the square wave produced by the generator 10. Each of the multivibrators may be arranged to produce substantially rectangular positive and negative signals in the output circuit thereof with respect to a preselected reference level, which may, for example, be ground, when in the first and second states of operation, respectively. Each of the multivibrators may be further arranged to change from the first to the second state of operation in response to the application to the input circuit thereof of a positive signal with respect to ground, and to change to the first state of operation in response to the application to the input circuit thereof of a negative signal.

Three summing circuits 23, 24 and 25 are provided for controlling the operation of the multivibrators 12, 13 and 14, respectively. The summing circuit 23 includes a pair of input circuits 26 and 27 and an output circuit 28, which is connected to the input circuit of the multivibrator 12; the summing circuit 24 includes a pair of input circuits 30 and 31 and an output circuit 32, which is connected to the input circuit of the multivibrator 13; and the summing circuit 25 includes a pair of input circuits 33 and 34 and an output circuit 35, which is connected to the input circuit of the multivibrator 14. As is shown, one side of each of the pairs of input circuits of the summing circuits 23, 24 and 25 is connected to ground. The input circuits 26 and 27 of the summing circuit 23 are connected respectively to the square wave generator and to the non-grounded terminal of the output terminals 20. The input circuits 30 and 31 of the summing circuit 24 are connected respectively to the square wave generator 10 and the non-grounded terminal of the output terminals 16. The input circuits 33 and 34 of the summing circuit 25 are connected respectively to the square wave generator 10 and to the non-grounded terminal of the output terminals 18.

In describing the operation of the circuit of Fig. 1, reference will be made to Fig. 2, wherein the ordinate represents voltage and the abscissa represents time. The curve $e_g$ represents the voltage across the output terminals 11 of the generator 10; the curve A is taken by measuring the voltage across the output terminals 16 of the multivibrator 12; the curve $e_b$ is taken by measuring the voltage across the input circuit 17 to the multivibrator 13;

the curve B is taken by measuring the voltage across the output terminal of the multivibrator 13; the curve $e_c$ is taken by measuring the voltage across the input circuit to the multivibrator 14; the curve C is taken by measuring the voltage in the output circuit of the multivibrator 14; and the curve $e_a$ is taken by measuring the voltage across the input circuit to the multivibrator 12.

To simplify the description of the operation of the circuit of Fig. 1, assume that the absolute magnitudes of the voltages produced by the generator 10 and the multivibrators are substantially equal and that just prior to the time $t_0$ the voltage $e_g$ is positive and the multivibrators 12, 13 and 14 are in the first, first and second states of operation, respectively. At time $t_0$ the voltage $e_g$ changes from a positive to a negative value 39.

During the time interval from $t_0$ to $t_1$ the input voltages to the summing circuit 23 are then both negative as a result of the output signal 39 from the square wave generator $e_g$ being negative and the output signal 40 from the multivibrator 14 being negative. These two negative signals are added in the summing circuit 23 to produce a negative signal 41 across the input circuit 15 to the multivibrator 12. Since the multivibrator 12 is arranged to assume its first state of operation in response to a negative signal, the multivibrator 12 remains in its first state during this time interval and produces a positive signal 42 across the output terminals 16.

During this same time interval the square wave generator applies the negative signal 39 to one input circuit of the summing circuit 24, and the multivibrator 12 being in its first state of operation applies a positive signal to the other input circuit of the summing circuit 24. These positive and negative signals are added in the summing circuit to produce a substantially zero voltage signal 43 in the output circuit 32 of the summing circuit 24, or in the input circuit to the multivibrator 13. This zero voltage signal 43 has no effect on the multivibrator 13 and the multivibrator 13 remains in its first state and produces a positive signal 44 across the output terminals 18.

During the time interval from $t_0$ to $t_1$ the summing circuit 25 receives a positive signal from the multivibrator 13 on one of its input circuits and a negative signal from the square wave generator 10 on its other input circuit. Again, these two signals are added to produce a substantially zero voltage signal 45 in the output circuit 35 or across the input circuit to the multivibrator 14. This zero voltage signal does not affect the state of the multivibrator 14 which remains in its second state of operation and produces a negative signal 40 across the output terminals 20.

During the time interval from $t_1$ to $t_2$ the square wave generator produces a positive signal 47. The output signal 42 from the multivibrator 12 is also positive at this time, and these two signals are combined in the summing circuit 24 to produce a positive signal 48 across the input circuit to the multivibrator 13 (see curve $e_b$). This positive signal causes the multivibrator 13 to change from its first to its second state of operation and produce a negative signal 49 across the output terminals 18. During this same time interval the summing circuit 25 receives the negative output signal 49 from the multivibrator 13 and the positive signal 47 from the generator 10 and produces a zero voltage signal across the input circuit to the multivibrator 14 which does not affect the operation of the multivibrator 14. The summing circuit 23 receives a negative signal from the multivibrator 14 and a positive signal from the generator 10 and also produces a zero voltage signal in its output circuit which does not affect the operation of the multivibrator 12. Thus only the multivibrator 13 changes its state from time $t_1$ to $t_2$.

From time $t_2$ to $t_3$ the square wave generator again produces a negative signal 50 which combines with the output signals from the multivibrators 12, 13 and 14 in the summing circuits 24, 25 and 23, respectively. Since only the output signal from the multivibrator 13 is negative during this time interval, only the summing circuit 25 produces an output signal 51 which is negative, and causes the multivibrator 14 to change its state and establish a positive signal 52 across the output terminals 20.

From time $t_3$ to $t_4$ the output signal from the multivibrator 14 is positive and the output signal from the generator 10 is positive. These signals are added in the summing circuit 23 to produce a positive signal 53 across the input circuit to the multivibrator 12 to cause it to change its state and establish a negative signal 54 across the output terminals 16. This operation continues with the multivibrators changing their states of operation in sequence to produce three rectangular waves A, B, and C in the output circuits of the multivibrators 12, 13 and 14, respectively. The output signals A, B, and C may be utilized to control suitable power amplifiers (not shown) which may supply three-phase power to a suitable load (not shown), or the output signals may be suitably filtered to provide sine wave voltages that are supplied directly to a three-phase load.

The frequency of operation of each multivibrator is equal to one-third the frequency of the signal from the square wave generator. Where the circuit of Fig. 1 is to be used in an inverter in missiles or similar systems which require 400-cycle three-phase power, the square wave generator should operate at 1200 cycles per second. Since all of the multivibrators are controlled by the generator 10 the output signals from the multivibrators are inherently phase-balanced. Also, the time intervals of the positive and negative portions of the output signals of all three phases may be accurately balanced by controlling the square wave generator 10 so that all half-cycles of the square wave signal have substantially equal time durations.

In describing the operation of the circuit of Fig. 1, it was assumed for ease of explanation that the absolute magnitude of the voltages produced by the square wave generator 10 and the multivibrators were substantially equal. It is not necessary, of course, that the voltages produced by the generator 10 and the multivibrators have substantially equal magnitudes. Each of the summing circuits 23, 24 and 25 may be arranged to add input voltages of different absolute magnitudes to cause the multivibrator controlled by the summing circuit to change from one state to another state of operation when both input voltages are at their high or positive level, to remain in the same state when both input voltages are at different levels, e.g., one being positive and one negative, and to change back to the one state of operation when both input signals are at the low or negative level.

Referring now to Fig. 3, which shows the circuit details of one way to carry out the invention shown in block diagram in Fig. 1, the square wave generator 10 includes a pair of transistors 60 and 61. The transistors 60 and 61 may be junction transistors of the PNP variety. Each of the transistors includes a base electrode, an emitter electrode, and collector electrode designated by the subscripts $b$, $e$, and $c$, respectively. The collector electrodes $60_c$ and $61_c$ are connected across a primary winding 62 of a coupling transformer 63. The emitter electrodes of the transistors are connected directly together and a source of direct current energizing potential 64 which may, for example, be a battery, is connected between a center tap connection 65 on the primary winding 62 and the emitter electrodes. As is shown, the positive terminal of the battery 64 is connected to the emitter electrodes and the negative terminal is connected to the center tap 65. The base electrodes of the transistors are connected together through a pair of base resistors 66 and 67, a pair of feedback windings 68 and 69, and a balancing potentiometer 70 which includes a movable contact 72. As is shown, the resistors 66, the winding 68, the potentiometer 70, the winding 69, and the resistors 67 are connected in series in that order between the base electrodes $60_b$ and $61_b$. The movable contact 72 of the potentiometer 70 is connected to the emitter electrodes of transistors 60 and 61. This potentiometer permits the currents or voltages in the output circuits of the transistors to be balanced.

The windings 68 and 69 are coupled to a saturable core 71 which includes primary winding 73. The winding 73 is coupled to the transformer 63 to provide regenerative feedback in the generator 10. The winding 73 is connected across a secondary winding 74 of the transformer 63 by means of the series combination of a frequency-adjusting potentiometer 75 and a resistor 76. A pair of zener diodes 77 is connected between the junction of the resistors 75 and 76 and one end of the winding 73, as shown. These diodes are arranged to clamp the voltage that is induced across the winding 74 to a suitable value for controlling the frequency of the generator 10, as will be more fully described.

The square wave generator 10 is a free-running multivibrator with regenerative feedback coupled to the base electrodes of the transistors 60 and 61 by means of the saturable core 71. A starting bias resistor 80 is connected between the negative terminal of the battery 64 in the base electrode $60_b$ to render the transistor 60 initially conducting when power is first supplied to the generator by means of the battery 64. Free-running multivibrators of this type are well known in the art. The frequency at which the free-running multivibrator or square wave generator 10 operates is dependent upon several factors which include, among other things, the voltage of the battery 64, the impedance of the resistors 75 and 76 and the potential level at which the zener diodes 77 break down. Thus the frequency of the generator 10 may be changed by varying any one of these parameters. It is not necessary, of course, to include the resistors 75 and 76 and the diode 77 in the feedback circuit since the frequency may be controlled by the battery 64 alone. However, one or more of these elements may be desirable to permit the frequency of oscillation to be easily adjusted.

The multivibrator 12 includes a pair of semiconductor devices 80 and 81 which may be junction transistors of the PNP variety. Each of the transistors includes a base, an emitter, and a collector electrode designated by the subscripts $b$, $e$, and $c$, respectively. This multivibrator is similar to the square wave generator 10, with the exception that a non-saturable transformer 86 is utilized in the regenerative feedback network thereof. The collector electrodes are connected across a primary winding 82 of an output transformer 83. The emitter electrodes are connected together and a battery 84 is connected between the emitter electrodes and a center tap connection 85 on the winding 82. As is shown, the positive terminal of the battery 84 is connected to the emitter electrode. A base resistor 94, a secondary winding 87 of the feedback transformer 86, a resistor 89, another resistor 90, another secondary winding 91 of the feedback transformer 86, and a base resistor 92 are connected in series in that order between the base electrodes $80_b$ and $81_b$. The junction of the resistors 89 and 90 is connected to the emitter electrodes $80_e$ and $81_e$. A regenerative feedback signal is coupled to the feedback transformer 86 by a primary winding 93 on the transformer 86. The winding 93 is connected at one end to the collector electrode $80_c$ and at the other end through a feedback resistor 96 to the collector electrode $81_c$. A starting resistor 99 is connected between the positive terminal of the battery 84 and the base electrode $80_b$ to render the transistor 80 initially conducting when power is initially supplied to the multivibrator. A secondary winding 98, including a center tap connection 100, is proivded on the output transformer 83 for deriving an output signal from the multivibrator 12.

The multivibrators 13 and 14 are substantially identical to the multivibrator 12 and like components thereof are designated by prime and double-primed numerals, respectively. The multivibrators 12 and 13 are identical and the multivibrators 12 and 14 differ only in the location of the starting resistors 99 and 99″. The resistor 99″ is connected between the negative terminal of the battery 84″ and the base electrode $81_b''$ instead of the base electrode $80_b''$.

While the batteries 64, 84, 84′ and 84″ have been illustrated as separate batteries, it should be understood that one battery or another source of direct current energizing potential may be utilized as the source of power for all of the transistors of the circuit of Fig. 3.

The summing circuit 23 includes a secondary winding 102 of the transformer 63 and a secondary winding 103 of the transformer 83″. As is shown, the windings 102 and 103 are connected in series relationship between the junction of the resistor 89 and the winding 87 and the junction of the resistors 90 and the winding 91 of the multivibrator 12. This summing circuit 23 adds the signals developed in the windings 102 and 103 and applies the sum signal to the base electrodes of the transistors 80 and 81. The summing circuit 25 likewise includes a secondary winding 105 of the transformer 63 and a secondary winding 106 of the transformer 83′, the windings being connected in series relationship between the resistors 89″ and 90″ of the multivibrator 14. The summing circuit 24 also includes a secondary winding 107 of the transformer 63 and a secondary winding 108 of the transformer 83, the windings being connected in series relationship to the resistors 89′ and 90′, as is shown.

The operation of the circuit of Fig. 3 is similar to the operation of the circuit of Fig. 1 and reference will now be made to the curves illustrated in Fig. 2. Assume now that power is initially applied to the square wave generator 10 and to each of the multivibrators 12, 13 and 14 simultaneously by the batteries 64, 84, 84′ and 84″, respectively. The transistor 60 of the square wave generator 10 is rendered conducting due to the negative potential applied to its base electrode with respect to its emitter electrode by the battery 64 through the resistor 80. Current flows from the emitter electrode through the transistor 60, through a portion of the primary winding 62, through the center tap connection 65 and back to the negative terminal of the battery 64. This current flow induces a positive voltage such as the voltage 45 in the curve $e_g$ across each of the secondary windings 74, 102, 105 and 107 of the transformer 63. The positive voltage induced across the winding 74 is clipped by the zener diodes 77 and applied to the saturable core 71 in an opposite phase relationship to render the base electrode $60_b$ even more negative than its emitter $60_e$. This feedback action in the generator 10 is cumulative and results in saturating the transistor 60.

At this same time the transistors 80, 80′ and 81″ are also rendered conducting due to the current flow through the starting resistors 99, 99′, 99″, respectively. Regenerative feedback is also established in each of these multivibrators by means of the transformer 86, 86′ and 86″ so that the transistors that were initially rendered conducting are saturated in a very short time. The current flow through the transistor 80 induces a positive voltage such as that indicated at 42 in the curve A across the secondary windings 98 and 108. The current flow through the transistor 80′ likewise induces a positive voltage such as that indicated at 44 in the curve B across the secondary windings 98′ and 106. The current flow through the transistor 81″ induces a negative voltage such as that indicated at 40 in the curve C across the secondary windings 98″ and 103.

Figure 2:
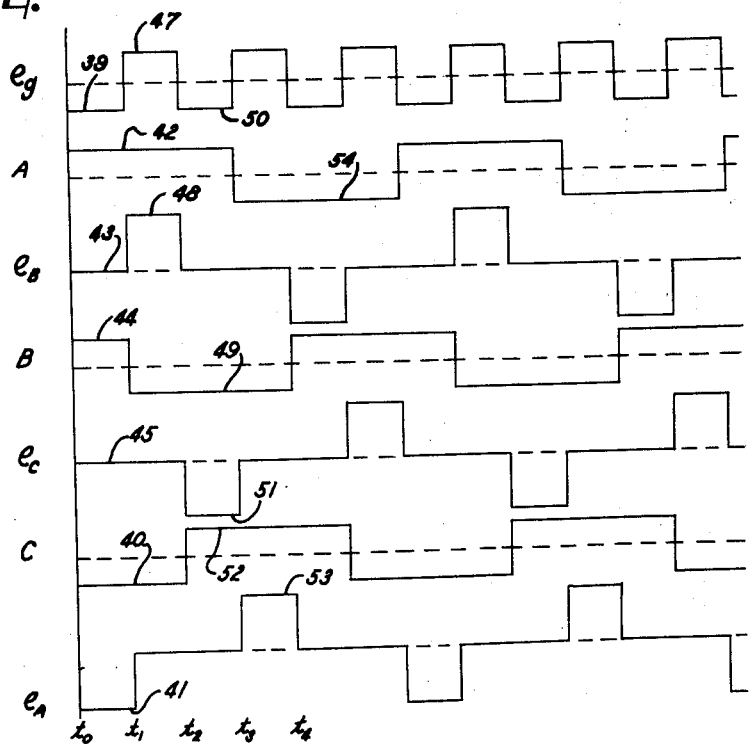
Fig. 2 is a graph illustrating wave forms taken at various points in the circuit of Fig. 1.
Figure 2:
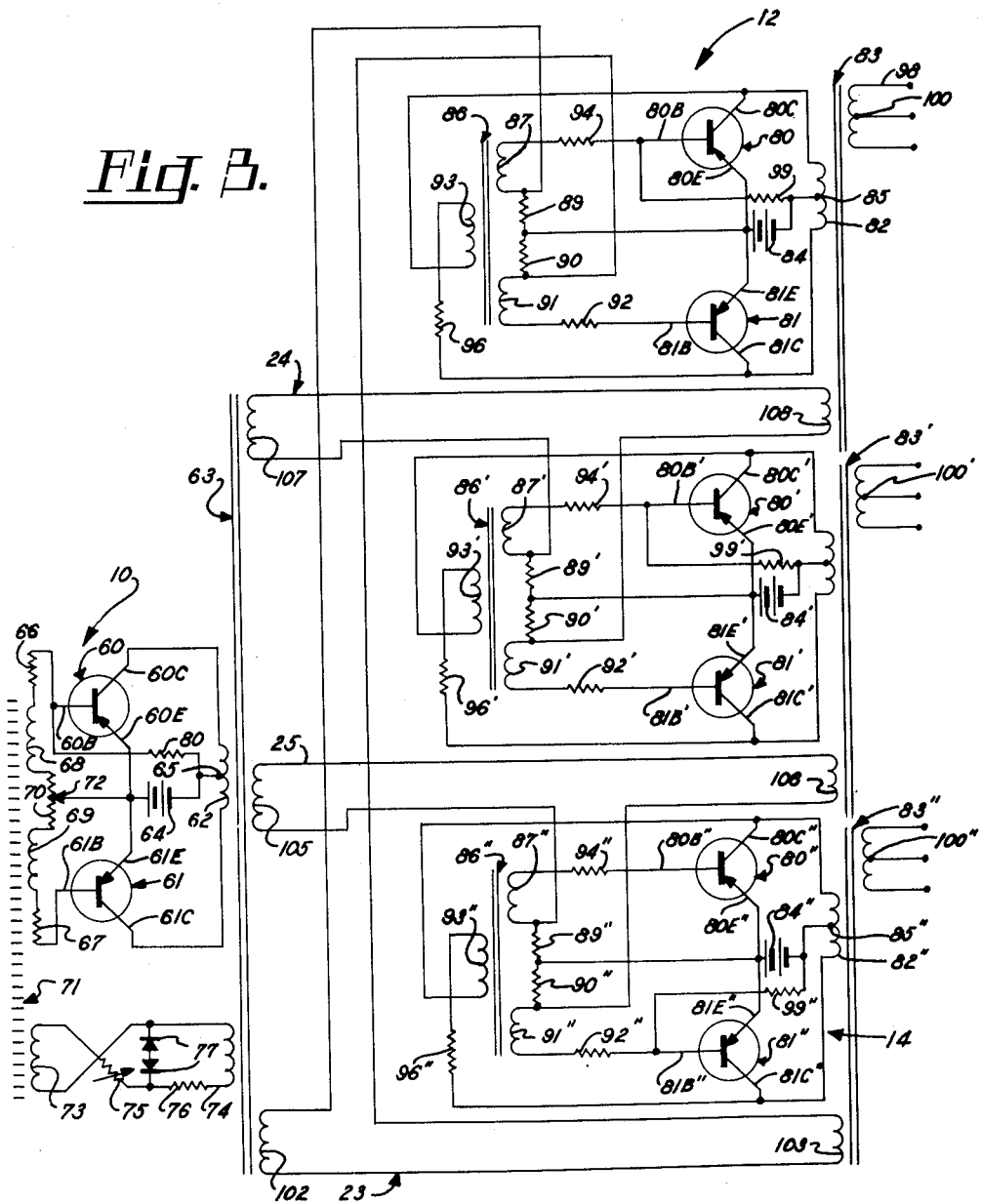

As may be see in the Fig. 2, this condition occurs at time $t_1$. During the time interval from $t_1$ to $t_2$ a positive voltage is induced across the secondary winding 102 and a negative voltage is induced across the winding 103. Assuming that these two voltages have substantially equal amplitudes, a zero voltage signal is induced across the bias resistors 89 and 90 by the summing circuit 23. Thus the multivibrator 12 does not change its state from $t_1$ to $t_2$ and produces a positive signal 42 across the windings 98 and 108.

During the time interval from $t_1$ to $t_2$ a positive voltage is induced across the winding 105 and a positive voltage is induced across the winding 106 of the summing circuit 25. These two voltages are combined in the summing circuit 25 to establish a positive potential across the resistors 89″ and 90′. The positive potential across the resistor 89″ biases the base of the transistor 80″ more positive than its emitter and thereby maintains the transistor 80″ non-conducting. The negative potential applied at the junctions of the resistor 90″ and the winding 91″ by the summing circuit 25 biases the base of the transistor 81″ more negative than its emitter and thereby increases the conduction of the transistor 81″. Thus the multivibrator 14 does not change its state of operation from time $t_1$ to $t_2$ and produces a negative signal 40 across the windings 98″ and 103.

The summing circuit 24 during the time interval from $t_1$ to $t_2$ receives two positive voltages across its input circuits or across the windings 107 and 108. These two voltages are added to produce a positive potential on the base of the transistor 80′ and a negative potential on the base of the transistor 81′. Thus at time $t_1$ the transistor 81′ is turned on by the summing circuit 24 and induces a regenerative feedback voltage in the windings 93′ and 87′ which turns off the transistor 80′. The current flow in the transistor 81′ induces a negative voltage such as that indicated at 49 in the curve B across the secondary winding 98′ and 106. Thus, during the time interval from $t_1$ to $t_2$ only the state of the multivibrator 13 is changed.

At time $t_2$ the square wave generator 10 changes its state of operation as a result of the core 71 saturating. The transistor 60 begins turning off just before time $t_2$ as a result of the voltage induced across the secondary winding 68 being insufficient to maintain the transistor 60 in a saturated condition. This action is regenerative and in a very short time the transistor 60 is completely non-conducting and the transistor 61 is saturated. The current flow through the transistor 61 produces a negative signal across the secondary windings 102, 105 and 107 as is indicated by 48 in the curve $e_g$. This signal combines with the negative voltage 49 induces across the secondary winding 106 of the multivibrator 13 to apply a negative voltage such as that indicated by 50 in the curve $e_c$ across the resistors 89″ and 90″ of the multivibrator 14. This negative voltage causes the multivibrator 13 to change its state by turning the transistor 81″ off and the transistor 80″ on. The current flow in the transistor 80″ induces a positive signal in the secondary windings 98″ and 103.

From time $t_3$ to $t_4$ the multivibrator 12 changes its state of operation as a result of the summing circuit 23 turning the transistor 80 off and the transistor 81 on. This operation continues as has been explained previously in connection with the circuit of Fig. 1.

While it is understood that the circuit specifications of the three-phase wave generator of the present invention may vary according to the desired design for any particular application, the following circuit specifications for the circuit of Fig. 3 to provide an output frequency of 400 cycles per second are included by way of example only:

Transistors 60, 61, 80, 91, 80′, 81′, 80″—type H–6 manufactured by the Minneapolis Honeywell Company
Batteries 64, 84, 84′ and 84″—plus 28 volts
Resistors 66 and 67—75 ohms
Potentiometer 70—10 ohms
Resistor 80—5000 ohms
Resistors 75 and 76—200 ohms
Resistors 86, 86′, 86″, 92, 92′, 92″—20 ohms
Resistors 89, 89′, 89″, 90, 90′, 90″—one ohm
Resistors 99, 99′ and 99″—5000 ohms There has thus been disclosed a three-phase wave generator that is relatively simple, inexpensive to manufacture, efficient, easy to adjust for different operating frequencies and inherently phase-balanced.

I claim:

1. A three-phase wave generator comprising means for generating a control signal varying periodically between a first and a second level at a predetermined repetition rate, first, second and third multistable devices, each of the devices including an input and an output circuit and being adapted to assume first and second states of operation in response to the application of signals to the input circuit thereof having first and second predetermined levels respectively, means responsive to the control signal and to the state of the third multistable device for applying a signal of the first predetermined level to the input circuit first multistable device when the control signal is at its first level and the third device is in its second state and for applying a signal of the second predetermined level to the input circuit of the first device when the control signal is at its second level and the third device is in its first state, means responsive to the control signal and to the state of the first multistable device for applying a signal of the first predetermined level to the input circuit of the second multistable device when the control signal is at its first level and the first device is in its second state and for applying a signal of a second predetermined level to the input circuit of the second device when the control signal is at its second level and the third device is in its first state, means responsive to the control signal and to the state of the second multistable device for applying a signal of the first predetermined level to the input circuit of the third multistable device when the control signal is at its first level and the third device is in its second state, and for applying a signal of the second predetermined level to the input circuit of the first device when the control signal is at its second level and the second device is in its first state; and means coupled to the output circuits of each of the multistable devices for deriving a three-phase output signal from the devices.

2. A three-phase wave generator comprising a source of substantially square wave signals, first, second and third multivibrators, each of the multivibrators including an input and an output circuit, first, second, and third summing circuits, each of the summing circuits having a pair of input circuits and an output circuit, one input circuit of each of the summing circuits being connected to the source of square wave signals, the other input circuit of the first, second and third summing circuits being connected to the output circuits of the third, first and second multivibrators, respectively, the output circuits of the first, second and third summing circuits being connected to the input circuit of the first, second and third multivibrators respectively, each of the summing circuits being adapted to establish a signal in the output circuit thereof that is proportional to the sum of the signals applied to the input circuits thereof.

3. A three-phase wave generator as defined in claim 2 wherein each of the multivibrators includes a pair of transistors, each of the transistors including base, emitter, and collector electrodes, the output circuit of each of the multivibrators being connected to the collector electrodes of the transistors of the multivibrator, the input circuits of each of the multivibrators being connected to the base electrodes of the transistors of the multivibrator, the emitter electrodes of the transistors of each multivibrator being connected together, whereby a signal developed across the input circuit to each multivibrator will be coupled in one phase relationship to the base and emitter electrodes of one of the transistors of the multivibrator and in an opposite phase relationship to the base and emitter electrodes of the other transistor of the multivibrator.

4. A three-phase wave generator comprising a square wave generator for producing substantially square wave signals of a predetermined frequency and varying between positive and negative levels with respect to a preselected reference level; first, second, and third multivibrators, each of the multivibrators including an input and an output circuit and having first and second states of operation of at least temporary stability for the time interval of one and a half cycles of the square wave, each of the multivibrators being arranged to produce substantially rectangular positive and negative signals in the output circuit thereof with respect to the reference level when in the first and second states of operation, respectively; each of the multivibrators being further arranged to change from the first to the second state of operation in response to the application to the input circuit thereof of a positive signal with respect to the reference level, and to change from the second to the first state of operation in response to the application to the input circuits thereof of a negative signal with respect to the reference level; first, second and third summing circuits, each of the summing circuits having a pair of input circuits and an output circuit and being adapted to produce a signal in the output circuit thereof that is proportional to the algebraic sum of the signals applied to the input circuits thereof, means connecting the square wave generator to one of the input circuits of each of the summing circuits, means connecting the other input circuit of the first, second and third summing circuits to the output circuits of the third, first and second multivibrators, respectively, whereby the multivibrators are caused to change their states of operation in sequence to produce a three-phase signal, and means connected to each of the output circuits of the multivibrators for deriving the three-phase signal therefrom.

5. A three-phase wave generator as defined in claim 4 wherein each of the multivibrators includes a pair of semiconductor devices, and each of the summing circuits includes a pair of inductors connected in series relationship.

6. A three-phase wave generator comprising first, second, and third multivibrators, each of the multivibrators including a pair of transistors and having first and second discrete states of operation, one of the transistors of each multivibrator being adapted to conduct during the first state of operation and the other transistor of each multivibrator being adapted to conduct during the second state of operation, each of the multivibrators including an output circuit connected across the collector electrodes of the transistors thereof; means for causing one transistor of each multivibrator to conduct initially, first, second and third summing networks, each of the summing networks having a pair of input circuits and an output circuit and adapted to establish a signal across the output circuit that is a measure of the algebraic sum of the signals applied across the input circuits, circuit means coupling one of the input circuits of the first, second and third summing networks to the output circuit of the first, second and third multivibrators, respectively; circuit means coupling the output circuit of the first, second, and third summing networks across the base and emitter electrodes of each of the transistors of the second, third, and first multivibrators, respectively, and means for applying substantially square wave signals having a predetermined frequency to the other input circuit of each of the summing networks.

7. In an inverter for converting a direct current energizing potential to a three-phase voltage the combination comprising first, second, third and fourth transformers, each of the transformers including at least one primary winding, the first transformer including first, second and third secondary windings, the second, third, and fourth transformers including fourth, fifth and sixth secondary windings, respectively; first, second and third multivibrators, each of the multivibrators including an input circuit and an output circuit and being adapted to assume first and second states of operation, the output circuit of the first, second and third multivibrators being coupled to the primary winding of the second, third and fourth transformers, respectively; a source of direct current energizing potential, means coupling the source to the output circuits of each of the multivibrators, the first and fourth secondary windings being connected in series relationship across the input circuit of the second multivibrator, the second and fifth secondary windings being connected in series relationship across the input circuit of the third multivibrator, the third and sixth secondary windings being connected in series relationship across the input circuit of the first multivibrator; means for applying substantially square wave signals to the primary winding of the first transformer and means coupled to the second, third and fourth transformers for deriving output signals therefrom.

8. The combination as defined in claim 7 wherein each of the multivibrators is adapted to assume the first and second states of operation, respectively, in response to the application of positive and negative signals of a predetermined amplitude to the input circuit thereof and each of the multivibrators is arranged to establish positive and negative signals across the output circuit thereof when in the first and second states of operation respectively, and wherein the square wave signals applied to the primary winding of the first transformer vary between positive and negative levels, the absolute amplitude of the positive and negative levels of the square wave signal being substanitally equal to the absolute amplitude of the signals established in the secondary windings of the second, third and fourth transformers.

9. The combination as defined in claim 7 including mean for controlling the states of operation of each multivibrator when the direct current source is initially coupled to the multivibrators.

10. A wave generator for providing phase displaced waves including a preselected plurality of cascaded wave generating elements switchable between two conductive conditions and arranged in a closed circuit, a source of control pulses, and circuit means coupled to be responsive to the control pulses and signals representative of the conductive condition of a preceding element whereby the combination of same are effective to control the conductive condition of a succeeding element to thereby switch said elements in a time sequence to provide output waves having a phase relationship corresponding to the preselected number of plurality of said elements.

11. A wave generator for providing phase displaced waves as defined in claim 10 wherein said source of control pulses is a wave generating element switchable at a preselected rate higher than the switching rate of said cascaded wave generating elements, said rate determined by the number of phases for said output waves.

12. A three phase wave generator including three wave generating elements switchable between two conductive conditions and arranged in a ring circuit, a source of control pulses, and circuit means coupled to be responsive to the control pulses and to the conductive condition of a preceding element whereby preselected combinations of same render the succeeding elements conductive and non-conductive to thereby control the switching rate of said three elements to provide output waves therefrom having a three phase relationship.

13. A three phase wave generator including three wave generating elements switchable between two conductive conditions and arranged in a ring circuit, a source of control pulses, and summing circuit means coupled to be responsive to the control pulses and to the conductive condition of a preceding element whereby the sum of same control the switching rate of the succeeding element, said source of control pulses having a pulse repetition rate effective to switch said three elements at a submultiple of the repetition rate of said control pulses to have a three phase relationship.

14. A three phase wave generator as defined in claim 13 wherein said summing circuit means comprises an individual summing circuit coupled intermediate said source of control pulses and a pair of successive wave generating elements.

References Cited in the file of this patent

UNITED STATES PATENTS

| | | |
|---|---|---|
| 2,836,734 | Cichanowicz | May 27, 1958 |
| 2,840,728 | Haugk | June 24, 1958 |

FOREIGN PATENTS

| | | |
|---|---|---|
| 204,081 | Australia | Nov. 14, 1956 |